United States Patent [19]

Ikonen et al.

[11] Patent Number: 5,208,494

[45] Date of Patent: May 4, 1993

[54] METHOD FOR THE ELIMINATION OF TRANSIENTS FROM THE OPERATING VOLTAGE OF TDMA SYSTEM

[75] Inventors: Raimo Ikonen, Pertteli; Pekka Lonka; Pekka Mikkola, both of Salo, all of Finland

[73] Assignee: Nokia Mobile Phones Ltd., Salo, Finland

[21] Appl. No.: 863,137

[22] Filed: Apr. 2, 1992

Related U.S. Application Data

[63] Continuation of Ser. No. 484,210, Feb. 23, 1990, abandoned.

[30] Foreign Application Priority Data

Mar. 10, 1989 [FI] Finland .................................. 891168

[51] Int. Cl.⁵ ...................... H03K 17/687; H04B 1/10
[52] U.S. Cl. .................................... 307/572; 307/542; 307/296.4; 328/165; 328/167; 455/223
[58] Field of Search ................ 328/67, 167, 165, 162; 375/104; 455/223, 218; 307/363, 362, 296.4, 542, 572, 571, 570

[56] References Cited

U.S. PATENT DOCUMENTS

| | | | |
|---|---|---|---|
| 3,610,953 | 10/1971 | Gordon et al. | 307/571 |
| 3,740,581 | 6/1973 | Pfiffner | 307/570 |
| 3,970,869 | 7/1976 | Coats, Jr. | 307/570 |
| 4,203,072 | 5/1980 | Beningfield et al. | 455/223 |
| 4,322,995 | 4/1982 | Tavel | 307/521 |
| 4,471,245 | 9/1984 | Janutka | 307/571 |
| 4,521,917 | 6/1985 | Holt, Jr. | 328/165 |
| 4,701,715 | 10/1987 | Amazawa et al. | 307/542 |
| 4,839,908 | 6/1989 | Takayama | 375/104 |
| 4,890,021 | 12/1989 | Walker | 307/542 |
| 4,894,566 | 1/1990 | Rush | 307/542 |

FOREIGN PATENT DOCUMENTS

| | | | |
|---|---|---|---|
| 2637949 | 3/1978 | Fed. Rep. of Germany | 375/104 |
| 2003366 | 3/1979 | United Kingdom | 455/223 |

OTHER PUBLICATIONS

Radio and Electronics Constructor (GB), vol. 33, No. 1, Sep. 1979. "How to remove interfering noise spikes in a.m. radio receivers", by John Baker.
"Hand-Held Portable Equipment for Cellular Mobile Telephone", NEC Res.+Rev. (1987).
"Land Station and Mobile Station Equipment for a Cellular System Application" (1984).
"Digital Cellular Radio", Artech House (1988).

*Primary Examiner*—William L. Sikes
*Assistant Examiner*—Toan Tran
*Attorney, Agent, or Firm*—Darby & Darby

[57] ABSTRACT

This invention relates to a method by which transients can be eliminated in an apparatus comprising a current source and several functional blocks at least one of which produces transients in the operating voltage. According to the invention, a switch separates the current source and the transient-producing block from the other blocks during the time that transients are being produced and connects the current source to the other blocks and to an energy-storing buffer during the time that transients are not being produced.

10 Claims, 1 Drawing Sheet

METHOD FOR THE ELIMINATION OF TRANSIENTS FROM THE OPERATING VOLTAGE OF TDMA SYSTEM

This is a continuation of application Ser. No. 07/484,210, filed Feb. 23, 1990, abandoned.

BACKGROUND OF THE INVENTION

This invention relates to a method of eliminating transient in an apparatus comprising a current source and several functional blocks, at least one of which consumes a pulsating current which produces transients in the operating voltage.

In apparatuses in which the consumption of current by different blocks varies greatly and in which the consumption of current may be pulse-like, transients are formed in the operating voltage. When included in the operating voltage, transients are detrimental to those functional blocks which require a very stable operating voltage to function properly. For example, an especially stable operating voltage is required in digital radio telephones having a digital system based on time division multiplexing (TDMA). In this system, voltage-controlled oscillators (VCO) are used, for example, in the SAT detector and also in other blocks. As a result any transients in the supply voltage will cause great frequency deviations in the various circuits. Therefore, very strict specifications have been set for voltages in the TDMA system.

Usually transients are eliminated by means of various filters or a voltage regulator. When a transient is very sharp, a conventional regulator is not capable of following it and, thus, the transient is seen in the regulator output as a greater-than-allowed voltage variation. It is, therefore, difficult to eliminate transients completely by known methods.

SUMMARY OF THE INVENTION

By the method according to the present invention, a transient caused by the pulse-like current intake of some block to the other blocks is denied access. The method is characterized in that a switch in the apparatus separates the current source and the transient-causing block from the other blocks during the time that transients are produced. The switch connects the current source and the transient-producing block to the other blocks and to the buffer during the time that no transients are produced.

Thus, in this method, the current source is continuously connected to the block or blocks which take in a current pulse with an abrupt leading edge. The current pulse will produce transients in the terminals of the current source. While the current pulse is being taken in, the switch separates the current source and the transient-producing blocks entirely from the rest of the system. During this time, the rest of the system receives its operating energy from a separate buffer. When no transients are being produced, the switch closes and connects the current source and the transient-producing blocks to the rest of the system and to the buffer. The blocks of the system now receive their operating energy from the current source, which at the same time charges the buffer.

BRIEF DESCRIPTION OF THE DRAWINGS

The method is now described in greater detail with reference to the accompanying figures, in which.

DETAILED DESCRIPTION OF A PREFERRED EMBODIMENT

Figure 1:
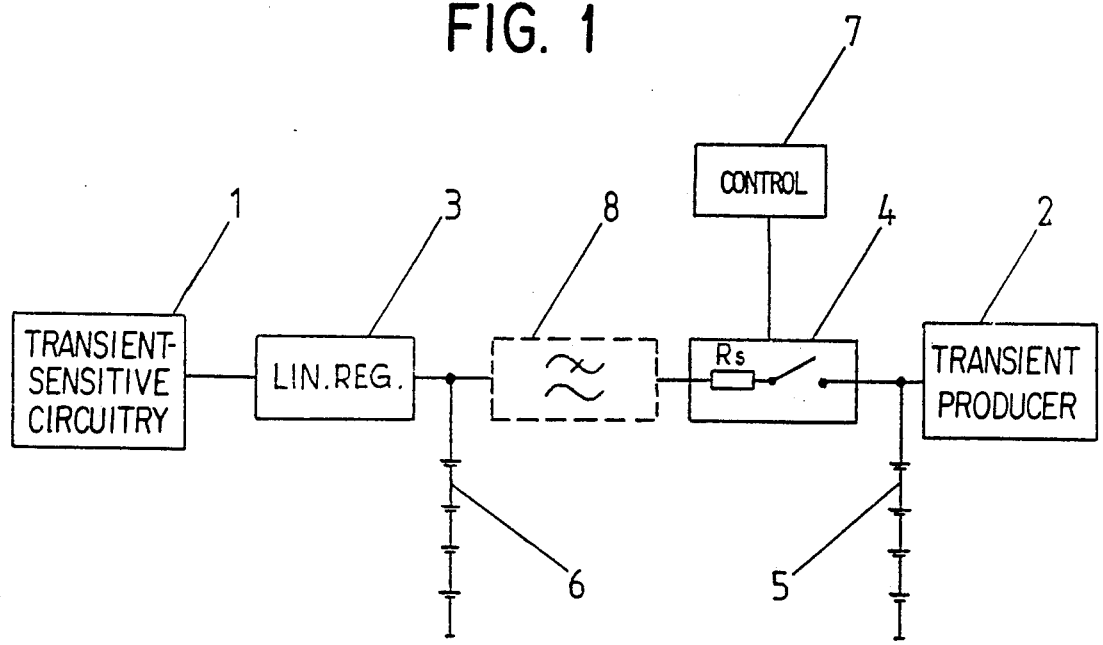
FIG. 1 is an illustration of the principle of the method.

In FIG. 1, block 2 represents a functional block or several functional blocks of a digital radio telephone taking in a high pulse-like current with an abrupt leading edge. The transmitter part of a radio telephone is such a block. Current is supplied to block 2, as it is to the entire system, by a current source 5, which may be, for example, a battery or an external source of voltage. Block 1 stands for the other functional parts of the radio telephone, such as the receiver, the synthesizer, and the logic unit. The linear regulator 3 regulates voltage to block 1. According to the invention, the system includes a switch 4 and a buffer 6, which serves as a place for storing energy. The buffer 6 may be any means in which energy can be stored and from which energy can be discharged. Preferably the buffer 6 is a battery, but depending on the application, it may also be a capacitor.

The operation is as follows: In a radio telephone having a digital system based on time division multiplexing (TDMA), the transmitter of the radio telephone operates for a time interval of ⅛ T, T being the total time of the cycle. When the transmitter switches on, block 2 in FIG. 1 takes in a high pulse-like current having a very abrupt leading edge. Since the switch control 7 of the radio telephone is the microprocessor of the logic unit and the telephone operator based on TDMA, it knows when the transmitter will be turned on and off, so it causes the switch 4 to open at the same moment that the operation of block 2, i.e., the transmitter, begins and close when it ends. Thereupon, the transients produced by block 2 are seen at the terminals of the current source 5, but they cannot proceed to block 1, which requires a stable operating voltage. During this time, block 1 receives its operating voltage from the buffer 6. When the current-taking by block 2 ends, the control closes the switch 4, whereupon block 1 takes in current from the current source 5. The current source 5 at the same time charges the buffer 6, the voltage of which is somewhat lower than the voltage of the current source 5. The charging will continue until the switch 4 opens and a new current pulse enters block 2. The closing of the switch 4 produces a rapidly rising step voltage in block 1. If the switch 4 is implemented as an ideal switch, the leading edge of the step voltage is vertical. In this case the linear regulator 3 is not capable of following the voltage, resulting in an undesirable voltage spike at its output. For this reason, a low-pass filter (shown by dashed lines in FIG. 1) is added between the switch 4 and the regulator 3. The low-pass filter delays the voltage and rounds out its leading edge, allowing the regulator 3 sufficient time to follow the voltage. When the switch 4 includes a transistor, for example a MOSFET transistor, it is advantageous to regulate the operation of the switch by means of a round-edged control pulse, in which case the rising rate of the voltage at the time of the closing of the switch 4 becomes more gradual and the regulator 3 is capable of correcting the voltage so as to meet the requirements of block 1. The on-resistance of the switch 4 adjusts the amplitude of the charging current of the buffer 6. It is, of course, also possible to use a separate resistance in addition to the resistance of the switch itself, if a lower charging current is desired.

Figure 2:
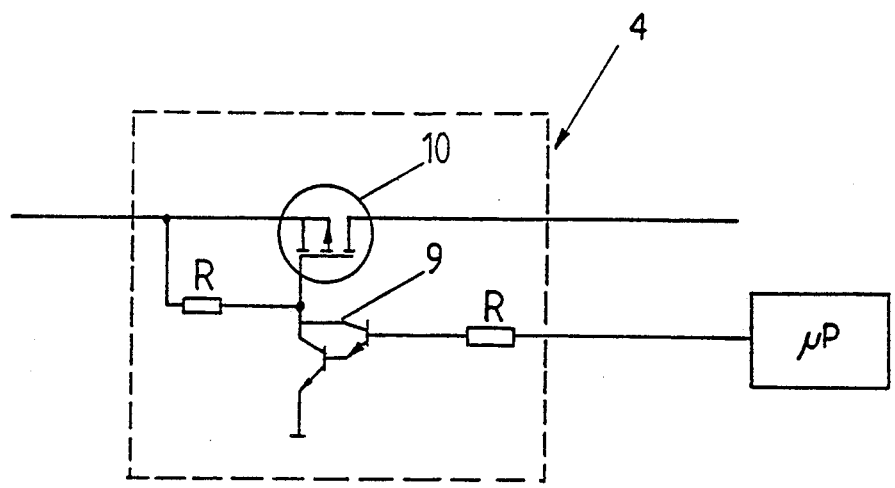
FIG. 2 is an example of the implementation of the switch.

One practical embodiment of the switch 4 is shown in FIG. 2. The control for the switch is obtained from the microprocessor of the logic unit of the telephone. Just before the current pulse arrives at block 2, the control pulse transmitted by the microprocessor drops, whereupon the Darlington-coupled transistor 9 is no longer conductive and the lattice voltage of MOSFET 10 rises and the p-channel closes, i.e. the switch 4 is open. Respectively, when block 2 is no longer taking in current, the control pulse transmitted by the microprocessor opens the MOSFET channel, i.e. the switch 4 closes.

In a radio telephone, the method according to the invention effectively protects those functional blocks which require a stable voltage from transients caused by other blocks. Although a radio telephone has been discussed above, the invention can also be applied to other electronic apparatuses. In practice, the device according to the invention can also be implemented in some manner other than that which has been described above, while keeping within the protective scope of the claims.

We claim:

1. A method of protecting an apparatus operating in a system based on time division multiplexing (TDMA) from detrimental effects of transients, the apparatus having a current source and a plurality of functional blocks, at least one of which is a transient producing block which takes in current in pulses from said current source according to TDMA and which, in response produces transients in operating voltage, the method comprising the steps of:
   separating the current source and the transient-producing block from at least one other block for time intervals when the transient producing block takes in pulses of current and produces the transients, the separating taking place via a switch, and
   connecting the current source to the one other block and to an energy-storing buffer via the switch when the transient producing block stops taking in pulses of current so that transients are not produced.

2. A method according to claim 1, wherein the energy-storing buffer supplies the operating voltage to the one other block requiring a stable operating voltage while the switch is open.

3. A method according to claim 2, wherein the energy-storing buffer is a battery.

4. A method according to claim 1, wherein the switch is a semiconductor switch.

5. A method according to claim 4, wherein the control unit comprises a microprocessor and the switch is controlled by the microprocessor.

6. A method according to claim 1, wherein a low-pass filter is installed between the switch and the buffer.

7. In an apparatus operating in a system based on time division multiplexing (TDMA) and having a current source for supplying current to a plurality of functional blocks including supplying a current to at least one of the blocks which takes in the current in pulses according to TDMA and which constitutes a current-taking functional block, said pulsating current-taking functional block producing transients in operating voltage in response to the taking in of current pulses, a method of isolating one other block of the functional blocks from the transients, comprising the steps of:
   separating the current source and the pulsating current-taking functional block from the one other block for time intervals according to TDMA when the current-taking functional block takes in the current pulses and produces the transients, the separating taking place via a switch; and
   connecting the current source to the one other block and to an energy-storing buffer via the switch when the current-taking functional block stops taking in the current pulses so that production of the transients have ended.

8. A method according to claim 1, further comprising the step of opening the switch for effecting the step of separating and closing the switch for effecting the step of connecting.

9. A method of protecting an apparatus from detrimental effects of transients, the apparatus operating in a system based on time division multiplexing (TDMA), the apparatus having a plurality of functional blocks including a transient producing block which, in response to being turned on according to TDMA, takes in current pulses from a current source and produces transients in operating voltage, the method comprising the steps of:
   separating via a switch the current source and the transient-producing block from at least one other of the plurality of functional blocks, the step of separating taking place during time intervals when the transient-producing block takes in the current pulses and thereby produces the transients;
   connecting via the switch the current source to the one other of the plurality of functional blocks and to an energy storing buffer, the step of connecting taking place during time intervals when the transient-producing block stops taking in the current pulses and thereby ceases production of the transients; and
   opening and closing the switch via a control unit for selectively effecting the steps of separating and connecting.

10. An apparatus for protecting against detrimental effects of transients, comprising;
   a current source;
   a plurality of functional blocks including a transient producing block which, in response to being in operation takes in pulses of current from the current source and produces transients in operating voltage;
   a switch;
   a control unit to open the switch for separating the current source and the transient-producing block from at least one other of the plurality of functional blocks during time intervals when the transient-producing block takes in the current pulses and thereby produces the transients;
   an energy storing buffer;
   said control unit also to close the switch for connecting the current source to the one other of the plurality of functional blocks and to the energy storing buffer during time intervals when the transient-producing block stops taking in the current pulses and thereby ceases production of the transients.

* * * * *